United States Patent
Jefferies

(10) Patent No.: US 9,065,269 B2
(45) Date of Patent: Jun. 23, 2015

(54) METHOD FOR COMPENSATING OVERLOAD TRIP CURVE FOR CT ERROR

(75) Inventor: Kevin Jefferies, Raleigh, NC (US)

(73) Assignee: SCHNEIDER ELECTRIC USA, INC., Palatine, IL (US)

( * ) Notice: Subject to any disclaimer, the term of this patent is extended or adjusted under 35 U.S.C. 154(b) by 814 days.

(21) Appl. No.: 13/233,457

(22) Filed: Sep. 15, 2011

(65) Prior Publication Data
US 2013/0070373 A1  Mar. 21, 2013

(51) Int. Cl.
| | |
|---|---|
| H02H 5/04 | (2006.01) |
| H02H 7/08 | (2006.01) |
| H02H 3/00 | (2006.01) |
| H02H 3/08 | (2006.01) |
| H02H 6/00 | (2006.01) |

(52) U.S. Cl.
CPC ............. *H02H 3/006* (2013.01); *H02H 3/085* (2013.01); *H02H 6/005* (2013.01)

(58) Field of Classification Search
CPC ...... H02H 7/085; H02H 7/0833; H02H 3/247
USPC ..................................... 361/28, 31
See application file for complete search history.

(56) References Cited

U.S. PATENT DOCUMENTS

| | | | |
|---|---|---|---|
| 3,458,810 A | 7/1969 | Wald | |
| 3,534,247 A | 10/1970 | Miljanic | |
| 5,057,962 A | 10/1991 | Alley et al. | |
| 5,222,009 A | 6/1993 | Scharnick et al. | |
| 5,436,784 A | 7/1995 | Schweitzer, III et al. | |
| 5,668,692 A | 9/1997 | Rodgers et al. | |
| 5,872,722 A * | 2/1999 | Oravetz et al. | 700/292 |
| 5,987,393 A * | 11/1999 | Stinson | 702/105 |
| 6,590,380 B2 | 7/2003 | Edel | |
| 6,954,060 B1 | 10/2005 | Edel | |
| 6,988,043 B1 | 1/2006 | Randall | |
| 8,441,768 B2 * | 5/2013 | Kasztenny | 361/93.2 |
| 2001/0019299 A1 | 9/2001 | Gotzig | |

FOREIGN PATENT DOCUMENTS

| | | | |
|---|---|---|---|
| EP | 0828329 A2 | 3/1998 | |
| EP | 828329 A2 * | 3/1998 | ............... H02H 3/00 |

OTHER PUBLICATIONS

International Search Report corresponding to co-pending International Patent Application Serial No. PCT/US2012/052755, European Patent Office, dated Dec. 19, 2012; (5 pages).
International Written Opinion corresponding to co-pending International Patent Application Serial No. PCT/US2012/052755, European Patent Office, dated Dec. 19, 2012; (7 pages).

* cited by examiner

*Primary Examiner* — Eduardo Colon Santana
*Assistant Examiner* — Gabriel Agared
(74) *Attorney, Agent, or Firm* — Locke Lord LLP

(57) ABSTRACT

A digital thermal model for compensating for error in a current transformer used in a solid-state overload relay. The thermal model implements a difference equation that determines using a low-pass filter two parameters corresponding to calibration points along an overload trip curve. The trip curve is adjusted at an ultimate trip current (one calibration point) independently of a trip time at a locked rotor current (another calibration point) of a motor protected by the overload relay. The ultimate trip current and trip time can be adjusted based on a motor full load current set by a user. Large CT error will cause the thermal model to adjust the trip time at the locked rotor current, increasing the range of acceptable CT error, allowing the overload relay to have a wider adjustment range.

18 Claims, 5 Drawing Sheets

METHOD FOR COMPENSATING OVERLOAD TRIP CURVE FOR CT ERROR

FIELD OF THE INVENTION

Aspects of the present disclosure relate to systems and methods for compensating for the variation in current transformer (CT) error at two calibration points across the range of currents protected by a trip curve for an overload relay.

BACKGROUND

Trip curves for motor overload relays are set at two meaningful calibration points: the ultimate trip current and the trip time at a specified current referred to as locked rotor current. The locked rotor current corresponds to a current required to overcome a locked rotor condition of a motor to cause the motor to begin to rotate. It is desirable for solid-state overload relays that implement a range of curves for different motor full load currents (MFLCs) to compensate for CT error (error in the current transformer(s) that monitor the current going through the relay) that differs across the range of measurement, compounded by the range of adjustment. An MFLC corresponds to a maximum current drawn by a motor when delivering its full rated output power (e.g., as specified by the manufacturer).

One approach is to characterize the CT error and use an error function to correct the input to a thermal model (i.e., a model that characterizes an overload trip curve in an overload relay). However, some overload relays, such as self-powered overload relays, have a limited amount of current available for powering the electronics, and performing this compensation digitally requires substantial processing power. While the error function can be implemented in an analog circuit, analog circuits require expensive, physically bulky, and current-consuming components.

Basic overload relays use a gain setting that compensates statically for the CT error. One implementation sets an adjustable gain based on the ultimate trip current setting to set the trip curve at the ultimate trip current. For each trip curve in the overload relay, a single gain is applied to the measured CT signal prior to input to a thermal model. But, this implementation cannot correct for changes in the CT error across the range of current covered by the trip curve. Depending on the variation of CT error, this method does not allow the overload relay to meet the required calibration points of the trip curve. Specifically, this method does not compensate for changes in CT error in the trip time between the ultimate trip current and the locked rotor current.

What is needed is a way of compensating for the variation in CT error across the range of currents protected by a trip curve for an overload relay.

BRIEF SUMMARY

Aspects of the present disclosure use two compensation constants or parameters for each trip curve. One parameter, called a gain compensation parameter, K2, determines the ultimate trip current, and a second parameter, called a filter update period parameter, tau, determines the trip time at the locked rotor current of the motor being protected by the overload relay. Using independent parameters of an equation establishing the trip curve allows two calibration points to be independently adjusted to compensate for CT error at both the ultimate trip current (first calibration point) and the trip time at the locked rotor current (second calibration point), without requiring additional computational overhead on the controller implementing the trip curve. The present disclosure compensates at the two calibration points for a CT error that varies along the trip curve current axis.

The present disclosure is particularly advantageous for solid-state overload relays, and in particular self-powered overload relays that have unique design constraints, particularly around the cost and current consumption of the electronics. However, the present disclosure is not limited to solid-state or self-powered overload relays. The implementations disclosed herein do not require significant processing power or current consumption and can be realized with a relatively small number of component parts and a minimum number of discrete analog components.

A focus of the protection schemes disclosed herein is the thermal protection function of an overload relay. The thermal protection implements a trip curve that is defined by coordinates in current and time, and a method of interpolating between them. Applicable standards, such as the International Electrotechnical Commission (IEC) 60947-4-1 standard or the Underwriters Laboratories (UL) 508 standard, which will be harmonized as UL 60947-4-1 after the filing date of the present disclosure, define multiple points or regions where the solid-state overload relay (SSOLR) must not trip, or must trip within some time limits. The requirements of the applicable standard are reduced through analysis to create parameters for ideal curves; e.g., a nominal current level or trip time is chosen from a specified acceptable range. The "ultimate trip" current is one such trip curve parameter. It divides the current axis into two regions: one where the overload relay must not trip on an overload condition, and one in which it must trip. This can be represented as a trip time asymptotically approaching infinity at the ultimate trip current. "Locked rotor" current is another typical trip curve parameter; it is used for setting an ideal trip time and an acceptable error range at a certain current. The standards do not specify a method of interpolating between these points; trip curves are an attempt to model motor heating (thermal model) as accurately as possible given the limited data and resources available to the overload relay.

The following Equation 1 generalizes the curve implemented by an overload relay thermal protection.

$$\text{trip time} = -\tau \times \ln\left[1 - \left(\frac{I_R}{I}\right)^P\right] \quad \text{(Equation 1)}$$

In this equation $I_R$ represents the ultimate trip current, I represents the applied current to the overload relay, P represents the desired order of the trip curve (2 for $I^2*t$, 1 for $I*t$), and $\tau$ (tau) is a constant. The ultimate trip current is a function of a user setting of the Motor Full Load Current (MFLC), which is provided by the manufacturer of the motor being protected by the overload relay. P is a constant that determines the shape of the trip curve, a design parameter generally specified by the overload relay manufacturer. Product standards define the range of trip times at locked rotor current, based on common motor characteristics. With these parameters defined for the thermal protection required for a specific motor, Equation 1 can be solved for $\tau$. This allows the rest of the trip curve between the ultimate trip current and locked rotor current to be characterized.

Existing implementations of this trip-time equation in a self-powered overload relay use a first-order low-pass filter, constructed by an analog resistor-capacitor (RC) filter, such as shown in functional blocks in FIG. 1, discussed below. This circuit provides a logarithmic response, appropriate for modeling the heating of the motor and achieving the trip-time Equation 1 shown above. The RC filter undesirably adds analog components compared to microcontrollers.

Prior-art error compensation in the self-powered overload compensates for CT error by setting an adjustable gain for each trip curve, across the entire range of the curve. FIG. 1 shows the difference equation for a prior-art error compensation implementation in solid-state overload relays.

FIG. 1 shows a known thermal model 100, implemented using the gain blocks K1 and K3, a memory TH 102 updated at a period tau, and a constant K2. In this thermal model 100, the adjustable gain constant K3 provides the only correction for CT error, based on the error at ultimate trip. K2 corresponds to the trip threshold, which determines the ultimate trip current. The thermal model is stored in the memory TH 102. The combination of tau and K1 determine the transient characteristics of the filter, for example the trip time at any current along the curve. The trip time at the locked rotor current is given by the following Equation 2, which is derived from the difference equation shown:

$$\text{trip time} = -\text{tau} * \ln\left(1 - \frac{K2 * K1}{\text{in}_{locked\ rotor\ current} * K3(MFLC)}\right) \quad \text{(Equation 2)}$$

The historical motivation for the widespread adoption of this prior-art compensation method is that it can be implemented in low-cost, low-current consumption analog circuits that are particularly suited for use in self-powered, solid-state overload relays. In the analog domain, the adjustable gain K3 is implemented with a potentiometer, which is the adjustment means by which the user selects the trip curve based on the MFLC. The thermal model filter is implemented in a simple analog RC circuit as described above.

Calibration for CT error at the ultimate trip current is accomplished by setting the MFLC selection points of the potentiometer to account for the CT error at the ultimate trip current of each trip curve. If the CT error is particularly high at the ultimate trip current for a particular MFLC, the potentiometer adjustment point is set accordingly, to increase K3 to compensate for this CT error.

However, this prior-art compensation approach cannot address CT error that differs along the trip curve, or most importantly error differences between the locked rotor current and ultimate trip current. This is because the other parameters (e.g., K2, tau) of the difference equation are constant, by nature of the implementation in a circuit with constant parameters. Adjusting these other parameters would be substantially complex, requiring a different RC circuit for each MFLC setting.

Compared to prior-art CT error compensation methods for solid-state overload relays, which correct for CT error at one calibration point only along the trip curve (i.e., at the ultimate trip current), the present disclosure advantageously allows correction at two calibration points (at the ultimate trip current and at a trip time corresponding to the locked rotor current). The present disclosure also allows each trip curve implemented by the overload relay 210 to have minimum error at the two calibration points, which is beneficial for reducing the trip time error. The present disclosure further allows the use of CTs with a wider range of error and use of lower-cost materials.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
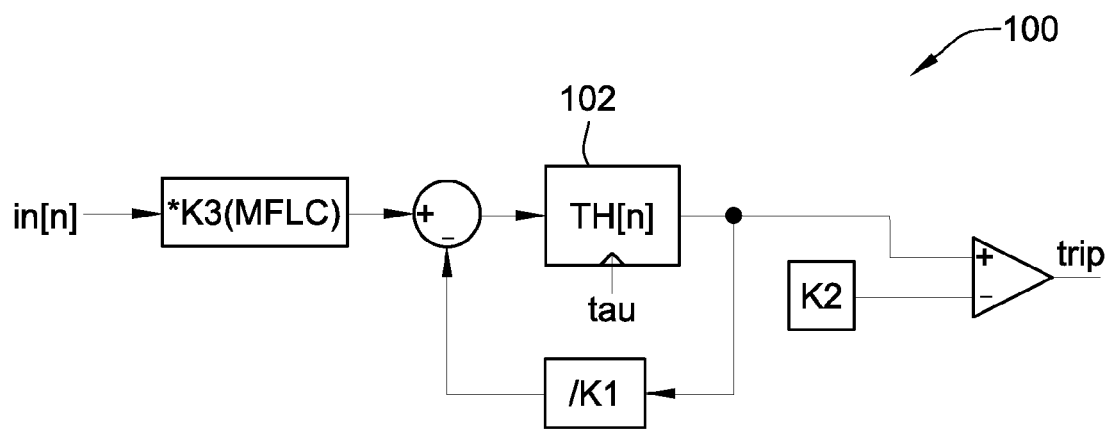
FIG. 1 is a functional block diagram of a prior-art thermal model that can account for CT error only at the ultimate trip current of a trip curve.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Aspects of the present disclosure use a digital implementation of a thermal model to compensate an overload trip curve for error produced by a current transformer (CT). Components for implementing a digital thermal model (e.g., the thermal model 300 shown in FIG. 3 discussed below) is shown in the functional block diagram of the system 200 depicted in FIG. 2. The system 200 includes an overload relay 210, which can be a solid-state overload relay (SSOLR) or a self-powered overload relay, or a solid-state, self-powered overload relay.

In this example, the overload relay 210 receives three phase conductors 212a,b,c, each carrying a different phase of electrical current. In other implementations, the overload relay 210 can receive fewer or more conductors. Each of the phase conductors 212a,b,c pass through corresponding current transformers 214a,b,c, which are conventionally referred to herein as CTs. CTs are well known and have a central opening through which an electrical conductor is passed, which induces a secondary current proportional to the primary current flowing through the conductor. The secondary current is provided in analog or digital form as an input current to a controller 220 in the overload relay 210, which can conventionally include an analog-to-digital converter for converting the analog current or voltage values to corresponding digital values. The controller 220 is coupled to a memory 202, which can be implemented on the same substrate as the controller 220 or on a separate substrate. The controller 220 is powered by a conventional power supply derived from the line current and rectified and ranged to appropriate levels (e.g., 3.3V), which can also optionally power the overload relay 210. Alternately, the overload relay 210 can be line-powered, in which case the overload relay 210 is directly powered from the line current instead of through a power supply derived from the line current.

An optional MFLC setting module 224 provides a user-adjustable MFLC setting to the controller 220, for reasons discussed in more detail below. The MFLC corresponds to a maximum current drawn by the motor 218 when delivering its full rated output power (e.g., as specified by the manufacturer of the motor 218). The user can conventionally set the MFLC, typically as a percentage, e.g., 80%, through a human-machine interface (not shown) or by adjusting a potentiometer (not shown) coupled to a dial on the overload relay.

Figure 2:
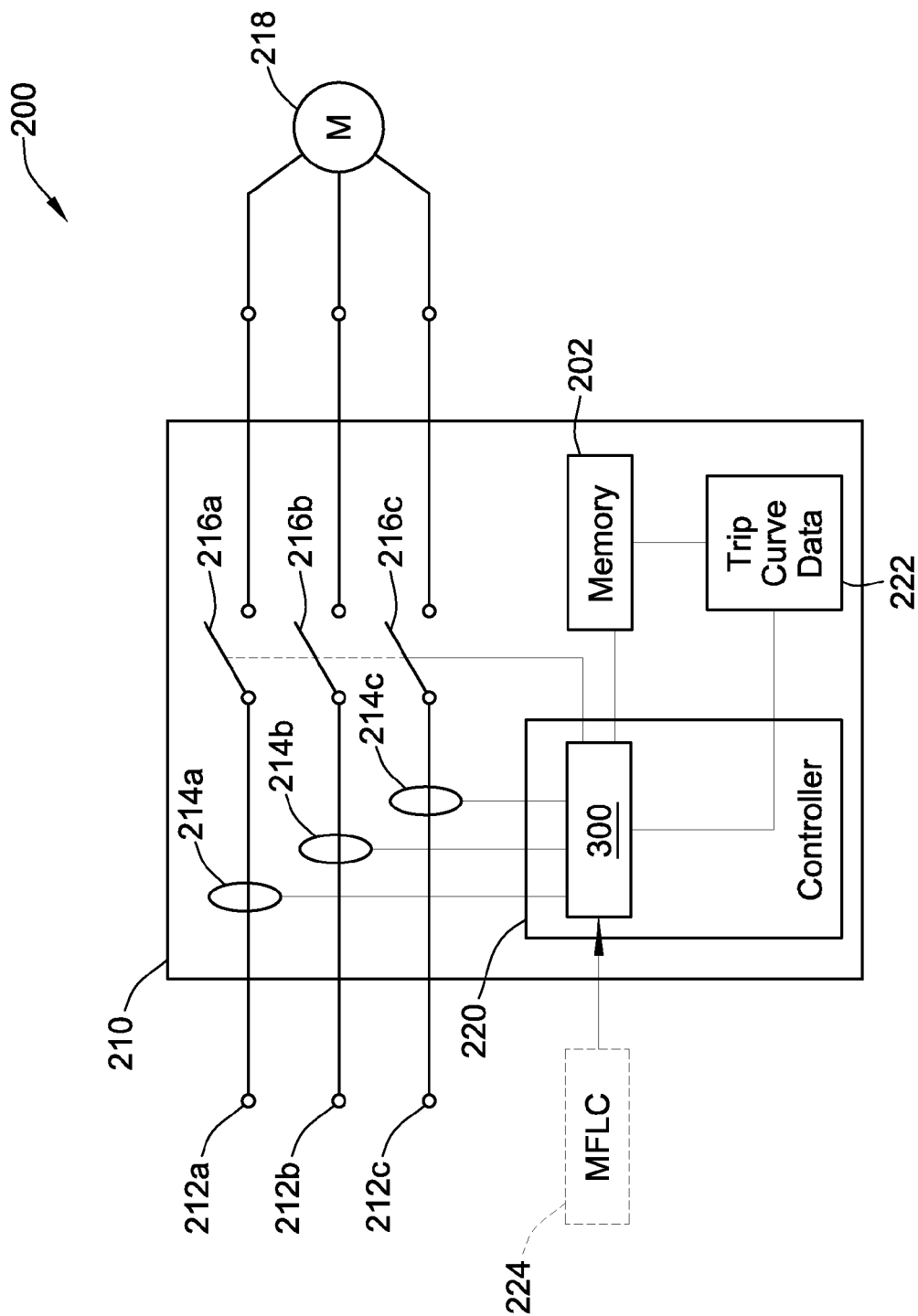
FIG. 2 is a functional block diagram of an overload relay having a controller configured to implement a thermal model for compensating for CT error at two calibration points on a trip curve according to aspects of the present disclosure.

Trip curve data 222, including one or more overload trip curves compensated according to the present disclosure, for the overload relay 210 is accessible by the controller 220 and is shown separately from the memory 202 to differentiate its data structure from other information stored in the memory 202. Of course, the trip curve data 222 can be stored in the memory 202. Each block shown in FIG. 2 is not intended to represent a discrete component part. Likewise, the memory 202 can be incorporated into the controller 220 without departing from the scope of the present disclosure.

The controller 220 compares the current measurements provided from the CTs 214a,b,c against the trip curve data 222 to determine whether the controller 220 should send a trip instruction to a coil or solenoid 216a,b,c to cause the overload relay 210 to trip and interrupt the current flow to a load 218 being protected by the overload relay 210, such as a motor. The memory 202 stores as the trip curve data 222 representations of at least a portion of one or more compensated overload trips at the ultimate trip current and the trip time at the locked rotor current. For example, the memory 202 can store the ultimate trip current value for the compensated overload trip curve and the trip time value at the locked rotor current for the compensated overload trip curve. Optionally, the memory 202 can also store as the trip curve data 222 a polynomial equation or a discrete-time value representation of the entire trip curve between the two calibration points (i.e., ultimate trip current and trip time at the locked rotor current).

Once the calibration points are determined by the thermal model 300 in conjunction with the controller 220, the overload trip curve(s) are now compensated for CT error in the overload relay 210. If the current measured by any of the current transformers 214a,b,c exceeds the corresponding trip curve at the ultimate trip current, the controller 220 causes the overload relay 210 to trip by sending a signal or signals to the coil or solenoid 216a,b,c Likewise, if the current measured by any of the current transformers 214a,b,c remains at or above the locked rotor current for a time that exceeds the trip time at the locked rotor current, the controller 220 causes the overload relay 210 to trip by sending a signal or signals to the coil or solenoid 216a,b,c.

Figure 3:
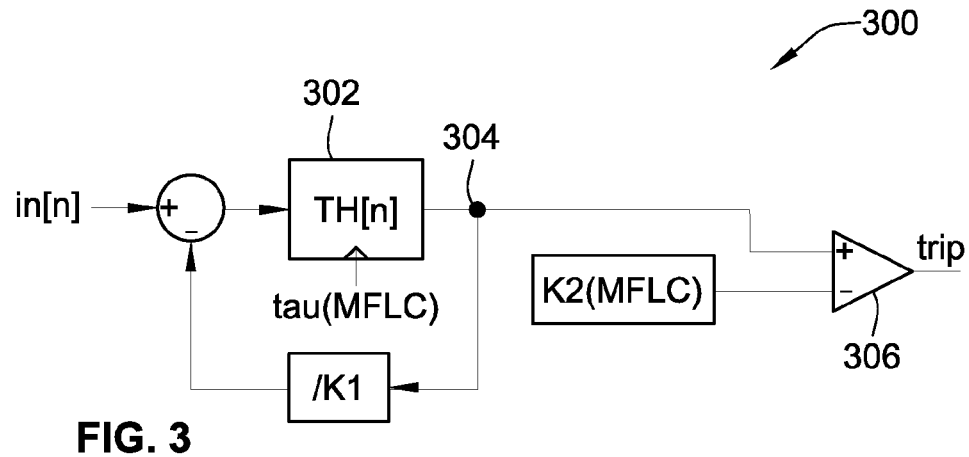
FIG. 3 is a functional block diagram of a digital thermal model expressed as a difference equation for compensating for CT error according to aspects of the present disclosure.

FIG. 3 is a functional block diagram of a difference equation that can be used in a thermal model 300 to implement CT error compensation according to the present disclosure. As in the prior-art thermal model shown in FIG. 1, the gain compensation parameter K2 corresponds to a trip threshold that determines the ultimate trip current, whereas the constant K1 and the filter update period parameter tau determine the transient behavior of the thermal model filter. The thermal model 300 compensates for CT error by adjusting two parameters for each trip curve, K2 and tau. K2, referred to herein as a gain compensation parameter, compensates for CT error at the ultimate trip current for each curve independent of tau. The ultimate trip current defines a trip threshold that if exceeded causes the overload relay to trip in response to an overload condition (e.g., the motor is excessively loaded beyond its rated capability). The filter update period parameter, tau, compensates for CT error in the trip time at the locked rotor current for each trip curve. The filter update period parameter, tau, is inputted into the thermal memory 302, whose output 304 is provided to a comparator 306.

For each trip curve, CT error can be compensated by carrying out the following two compensation phases independently of one another:

In the first phase, CT error is compensated at the ultimate trip current by determining the value of the gain compensation parameter, K2. K2 is set equal to the product K1*in[ ], using the value of in[ ] measured at the desired ultimate trip current. K1 is a fixed gain compensation parameter. K1 is determined by the accuracy required of the filter. A larger value of K1 means that the filter will be a larger number, and therefore K2 will be larger and can be changed with higher resolution. The filter can be designed with a maximum limit on the size of the TH[ ] filter in memory 302. K1 is set to use the maximum size TH[ ] 302 possible with this constraint. The input current in[ ] corresponds to discrete digitized samples of the current measured by the CT 214a,b,c at their respective secondary outputs. In this first phase of the compensation, the input current is measured at the ultimate trip current. In other words, a current corresponding to the ultimate trip current is supplied to the conductors 212a,b,c, and the corresponding input current measured at the secondary outputs of the CTs 214a,b,c is measured and sampled. The gain compensation parameter, K2, is determined from the MFLC 224 set by the user to produce a compensated trip threshold that is inputted to the comparator 306. Each MFLC setting 224 corresponds to a different value of K2.

In the second phase, CT error is compensated at the locked rotor current by determining the update period of the filter, tau. The filter update period parameter tau is set by analyzing the transient behavior of the filter, such that, using the value of in[ ] measured at the locked rotor current the filter reaches the value of the threshold K2 previously established at the desired trip time. Working from the difference equation shown in FIG. 3, the filter update period parameter tau is set according to the following Equation 3.

$$\text{tau} = \frac{-(\text{trip time at locked rotor current})}{\ln(1 - (\text{in}_{asymptotic\ current}/\text{in}_{locked\ rotor\ current})^2)} \quad \text{(Equation 3)}$$

Equation 3 can be solved for the trip time at the locked rotor current. $\text{in}_{asymptotic\ current}$ corresponds to the input current as it approaches the ultimate trip current, and $\text{in}_{locked\ rotor\ current}$ corresponds to the input current at the locked rotor current.

In this second phase of the compensation for CT error, a current corresponding to the motor's locked rotor current is injected into the conductors 212a,b,c, and the corresponding input current measured by the secondary outputs of the CTs 214a,b,c is measured and sampled. The filter update period parameter tau is determined by the MFLC 224 set by the user to produce a compensated trip time at the locked rotor current. Each MFLC setting 224 corresponds to a different value of tau.

The CT error is compensated at the ultimate trip current independently of the compensation for the error in the trip time at the locked rotor current. This allows both calibration points to be optimized separately, without being affected by large deviations or fluctuations in the trip curve for CT error between the two calibration points.

Figure 4:
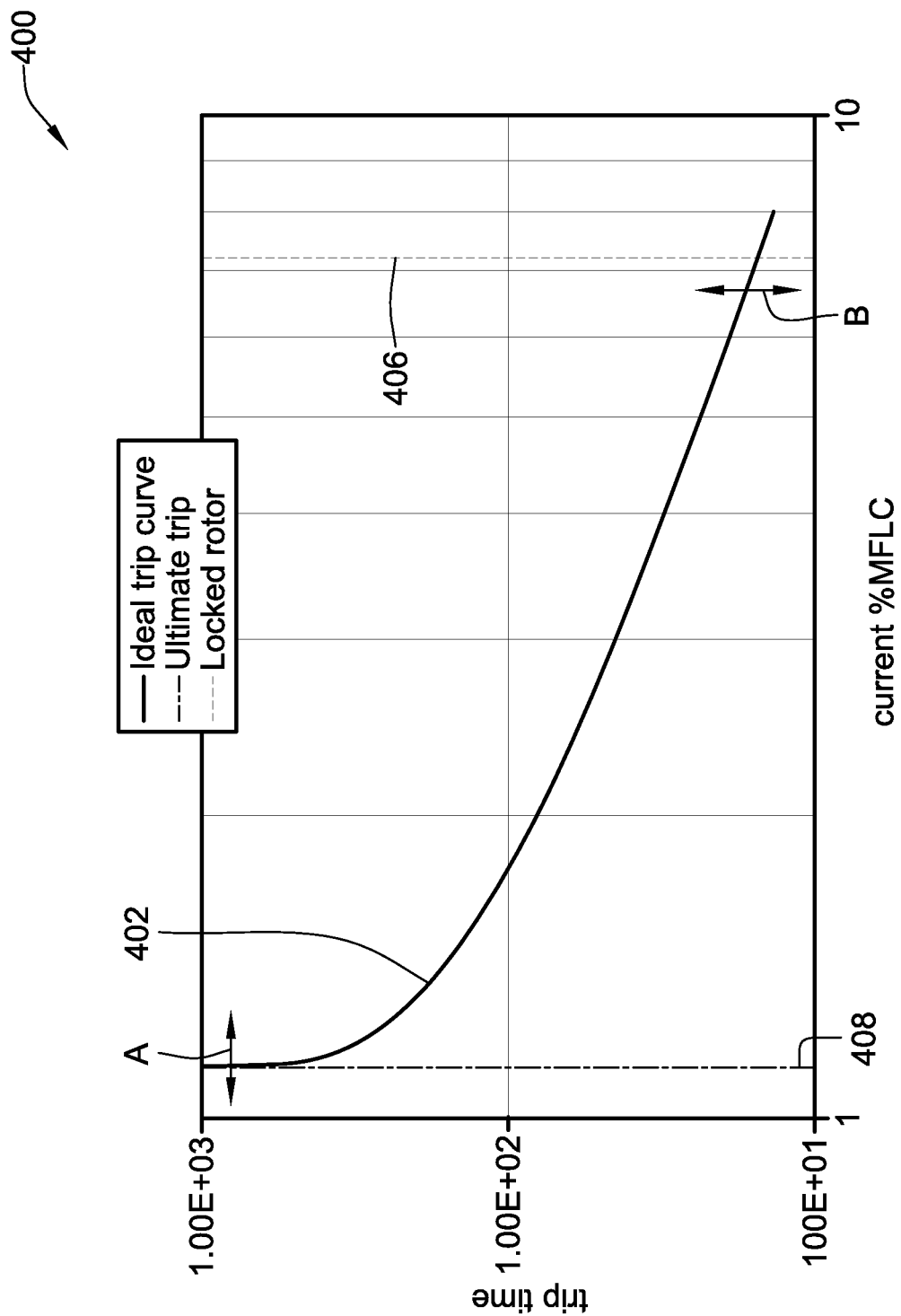
FIG. 4 is an ideal trip curve between two calibration points, an ultimate trip current and a trip time at a locked rotor current, to illustrate how the thermal model of the present disclosure shifts the trip curve at both calibration points to compensate for CT error at the two calibration points.

FIG. 4 illustrates an example ideal trip curve 402, the ultimate trip and locked rotor parameters, and the effect of CT error on the curve. The ultimate trip current 404 and the locked rotor current 406 are shown along the x-axis, expressed as a percentage of the user-selected motor full locked current MFLC 224. The trip curve 402 approaches the ultimate trip current 404 (determined by K2) asymptotically approaching infinite trip time and intersects the locked rotor current 406 at a trip time determined by tau. K2 shifts the asymptote of the trip curve 402 in the direction of arrow A, while tau shifts the trip curve at the locked rotor current 406 in the direction of arrow B. A large CT error will tend to shift the ultimate current 404 to the right along arrow A and up along arrow B at the locked rotor current 406. As the CT error increases, the CT magnetization losses dominate the error, eventually resulting in error in the relatively stable saturation region.

Figure 5:
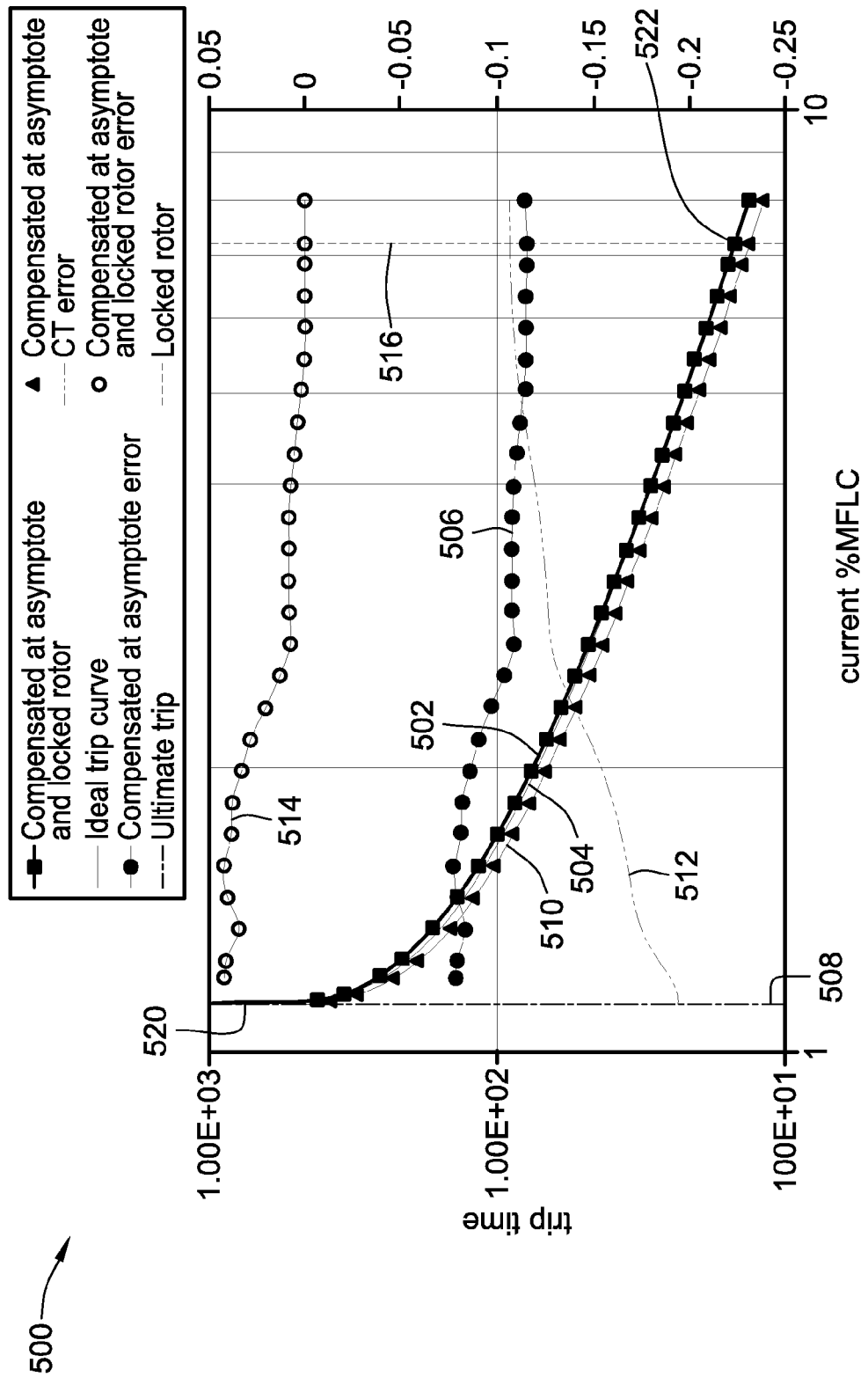
FIG. 5 is a graph comparing a trip curve using a prior-art compensation method versus a trip curve using a thermal model according to the present disclosure.

FIG. 5 illustrates with different trip curves how the CT error compensation implementations of the present disclosure are superior over analog prior-art compensation techniques. The input to the trip curves is produced by a CT having the error characteristic shown by the curve 512. The curve 510 uses the prior-art technique of compensating for error at only one point in the trip curve, and is set to correct for error at the ultimate trip current 508. The curve 502 compensates for CT error at the ultimate trip current 508 as well as locked rotor current 516, as described by the present disclosure. Data representing the curve 502 is stored as the trip curve data 222 shown in FIG. 2. The curve 504 represents the ideal trip curve for the CT. The CT error 512 is expressed as the ratio between the desired and achieved trip times along both curves 502, 510. Curve 506 represents the trip curve error when compensated for the CT error at the asymptote current (approaching the ultimate trip current 508), whereas curve 514 represents the trip curve error when compensated for the CT error at both the asymptote current and the locked rotor current 516. Two calibration points 520, 522 are shown corresponding to the ultimate trip current and a compensated trip time at the locked rotor current, respectively. These points 520, 522 can be stored in representative form in the trip curve data 222 (FIG. 2). The calibration point 520, although expressed for nomenclature convenience as a "point," is mathematically expressed as an asymptote of the compensated trip curve that approaches the ultimate trip current as the trip time approaches infinity. Thus, to be accurate, the trip curve "approaches" the ultimate trip current 508.

As FIG. 5 shows, the CT compensation implementations of the present disclosure removes the CT error from the trip time at the locked rotor current 516 (i.e., at the compensated trip time 522). By contrast, prior-art compensation schemes do not correct for the change in CT error along the trip curve itself, resulting in error in the trip time at the locked rotor current 516.

Figure 6:
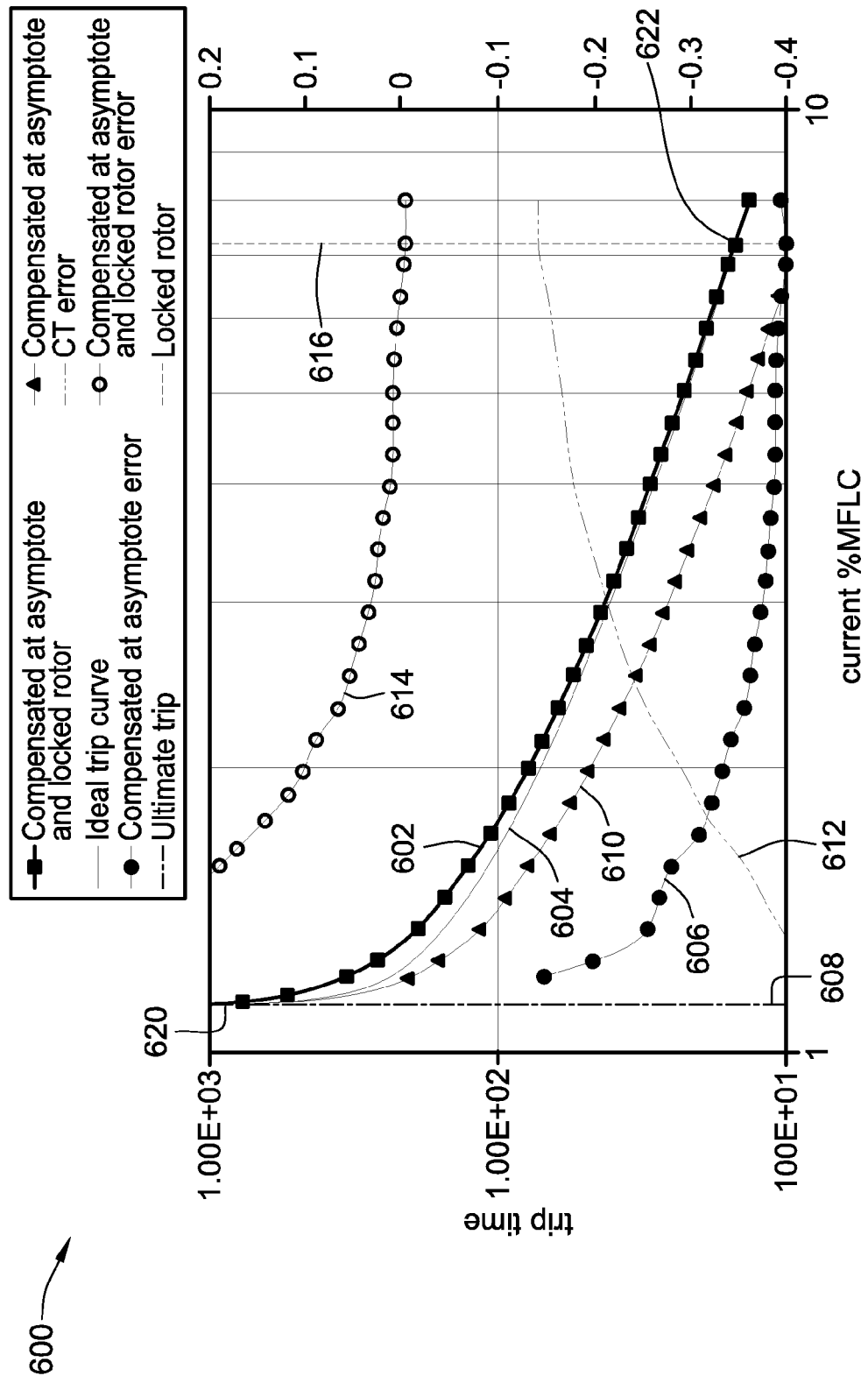
FIG. 6 is a graph comparing the same types of trip curves for a CT having a greater error than the one used to plot the curves shown in FIG. 5.

The results are even more dramatic as CT error increases. FIG. 6 illustrates a set of curves for a CT having a greater error along the trip curve compared to the CT in FIG. 5. The ideal trip curve 604 is shown relative to trip curve 602, which is compensated for CT error at both the asymptote (approaching the ultimate trip current 608) as well as at the locked rotor current 616, and trip curve 610, which is compensated for CT error at the ultimate trip current 608 only according to prior-art implementations. Data representing the curve 602 is stored as the trip curve data 222 shown in FIG. 2. The CT error is expressed by the curve 612. Curve 606 represents the trip curve error when compensated for the CT error at the asymptote current (approaching the ultimate trip current 608), whereas curve 614 represents the trip curve error when compensated for the CT error at both the asymptote current and the locked rotor current 616.

A primary goal of the present disclosure is to compensate for CT error at two calibration points for the trip curve, achieving the correct ultimate trip current and the correct trip time at locked rotor current. FIG. 6 highlights that aspects of the present disclosure do not compensate for CT error along the entire trip curve 602. The amount of CT error compensation along the rest of the trip curve depends on the characteristics of the CT error between the calibration points 608, 616.

Compensating for CT error at both calibration points (i.e., ultimate trip current and trip time at the locked rotor current) advantageously allows for the use of CTs with a wide range of error along the curve between the calibration points. The prior-art compensation method is not as well suited for use of high-error CTs, or limits the ability to design an overload relay that meets desirable low-tolerance trip time requirements at the locked rotor current. The present disclosure advantageously allows the use of CTs with a wider range of error in an overload relay while still satisfying a narrow window of trip times at the locked rotor current, which can result in the use of lower cost CT materials.

The increased range of permissible CT error also allows for a wider range of measurement, as the usable range of measurement is partially determined by the range of acceptable CT error. Increasing the range of measurement allows for the design of overload relays with a wider adjustment range.

Compared to the conceptually straightforward methods of compensation of using an error function to correct the input to the thermal model, the invention achieves the same correction at the calibration points of the trip curve, with none of the additional overhead required by implementing an error function. The invention requires no additional components, processing bandwidth or cost compared to implementing a thermal model without using the invention.

Any of the methods described herein can include machine or computer readable instructions for execution by: (a) a processor, (b) a controller, such as the controller 220, and/or (c) any other suitable processing device. It will be readily understood that the overload relay 210 can include such a suitable processing device. Any algorithm, software, or method disclosed herein can be embodied as a computer program product having one or more non-transitory tangible medium or media, such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.).

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of compensating an overload trip curve for error produced by a current transformer, comprising:
    compensating, using a controller, for the error at an ultimate trip current by adjusting the overload trip curve about a current axis corresponding to the ultimate trip current, the ultimate trip current defining a trip threshold that if exceeded causes an overload relay to trip responsive to an overload condition;
    compensating, using the controller, for the error in a trip time at a locked rotor current of a motor connected to the overload relay by adjusting the overload trip curve along a time axis at the locked rotor current, the locked rotor current corresponding to a current for overcoming a locked rotor condition of the motor to cause the motor to begin to rotate; and
    storing in a memory a representation of at least a portion of the compensated overload trip curve at the ultimate trip current and the trip time at the locked rotor current,
    wherein the compensating for the error in the trip time includes:
    the current transformer measuring an input current corresponding to the locked rotor current;
    calculating a filter update period parameter, tau, as a function of the measured input current, the gain compensation parameter, and the trip time at the locked rotor current; and
    updating a thermal model at the filter update period determined by tau.

2. The method of claim 1, wherein the compensating for the error at the ultimate trip current is carried out according to a function that includes a motor full load current (MFLC) corresponding to a maximum current drawn by the motor when delivering its full rated output power.

3. The method of claim 2, wherein the MFLC is adjustable by a user.

4. The method of claim 1, further comprising:
    causing the overload relay to trip responsive to a measured current exceeding the overload trip curve at the ultimate trip current; and
    causing the overload relay to trip responsive to the measured current at the locked rotor current exceeding the overload trip curve for the trip time.

5. The method of claim 1, wherein the compensating for the error at the ultimate trip current is carried out independently of the compensating for the error in the trip time.

6. The method of claim 1, further comprising powering the controller by a power supply that also powers the overload relay, wherein the overload relay is a self-powered, solid-state overload relay.

7. The method of claim 1, wherein the compensated overload trip curve includes an asymptote that approaches the ultimate trip current at the current axis and intersects the locked rotor current at a compensated trip time along the time axis.

8. The method of claim 1, wherein the compensating for the error at the ultimate trip current includes:
    the current transformer measuring an input current corresponding to the ultimate trip current;
    adjusting the input current by a fixed gain parameter to produce a gain compensation parameter; and
    adjusting the gain compensation parameter based on a motor full load current (MFLC) corresponding to a maximum current drawn by the motor when delivering its full rated output power to produce a compensated trip threshold.

9. The method of claim 8, wherein the adjusting includes multiplying the input current by the fixed gain parameter.

10. The method of claim 1, further comprising:
    comparing an output of the thermal model with the compensated trip threshold; and
    responsive to the output of the thermal model exceeding the compensated trip threshold, causing the overload relay to trip.

11. The method of claim 1, further comprising adjusting tau based on a motor full load current (MFLC) corresponding to a maximum current drawn by the motor when delivering its full rated output power.

12. A computer program product, comprising one or more non-transitory tangible media having a computer readable program logic embodied therein, the computer readable program logic configured to be executed to implement a method for compensating an overload trip curve for error produced by a current transformer, the method comprising:
    compensating, using a controller, for the error at an ultimate trip current by adjusting the overload trip curve about a current axis corresponding to the ultimate trip current, the ultimate trip current defining a trip threshold that if exceeded causes an overload relay to trip responsive to an overload condition;
    compensating, using the controller, for the error in a trip time at a locked rotor current of a motor connected to the overload relay by adjusting the overload trip curve along a time axis at the locked rotor current, the locked rotor current corresponding to a current for overcoming a locked rotor condition of the motor to cause the motor to begin to rotate; and
    storing in a memory a representation of at least a portion of the compensated overload trip curve at the ultimate trip current and the trip time at the locked rotor current,
    wherein the compensating for the error in the trip time includes:
    the current transformer measuring an input current corresponding to the locked rotor current;
    calculating a filter update period parameter, tau, as a function of the measured input current, the gain compensation parameter, and the trip time at the locked rotor current; and
    updating a thermal model at the filter update period determined by tau.

13. The computer program product of claim 12, wherein the compensating for the error at the ultimate trip current is carried out according to a function that includes a motor full load current (MFLC) corresponding to a maximum current drawn by the motor when delivering its full rated output power.

14. The computer program product of claim 13, the method further comprising:
    causing the overload relay to trip responsive to a measured current exceeding the overload trip curve at the ultimate trip current; and
    causing the overload relay to trip responsive to the measured current at the locked rotor current exceeding the overload trip curve for the trip time.

15. The computer program product of claim 13, wherein the compensating for the error at the ultimate trip current is carried out independently of the compensating for the error in the trip time.

16. The computer program product of claim 13, wherein the compensated overload trip curve includes an asymptote that approaches the ultimate trip current at the current axis and intersects the locked rotor current at a compensated trip time along the time axis.

17. The computer program product of claim 12, wherein the compensating for the error at the ultimate trip current includes:
- the current transformer measuring an input current corresponding to the ultimate trip current;
- adjusting the input current by a fixed gain parameter to produce a gain compensation parameter; and
- adjusting the gain compensation parameter based on a motor full load current (MFLC) corresponding to a maximum current drawn by the motor when delivering its full rated output power to produce a compensated trip threshold.

18. The computer program product of claim 12, further comprising:
- comparing an output of the thermal model with the compensated trip threshold; and
- responsive to the output of the thermal model exceeding the compensated trip threshold, causing the overload relay to trip.

* * * * *